United States Patent
Kuo et al.

(10) Patent No.: US 10,001,586 B2
(45) Date of Patent: Jun. 19, 2018

(54) POLARIZER HAVING QUANTUM ROD LAYER DIRECTLY CONTACTING A SURFACE OF A POLARIZING LAYER AT AN UNPOLARIZED LIGHT INCIDENT SIDE

(71) Applicant: BenQ Materials Corporation, Taoyuan (TW)

(72) Inventors: Chen-Kuan Kuo, New Taipei (TW); Shih-Wei Chao, Taoyuan (TW); Ren-Hung Huang, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 0 days. days.

(21) Appl. No.: 14/937,896

(22) Filed: Nov. 11, 2015

(65) Prior Publication Data

US 2016/0252658 A1    Sep. 1, 2016

(30) Foreign Application Priority Data

Feb. 26, 2015 (TW) .............................. 104106271 A

(51) Int. Cl.
  *G02B 1/14* (2015.01)
  *G02B 5/30* (2006.01)
  *G02F 1/1335* (2006.01)

(52) U.S. Cl.
  CPC ............. *G02B 1/14* (2015.01); *G02B 5/30* (2013.01); *G02F 1/133528* (2013.01); *G02F 1/133617* (2013.01); *G02B 5/3058* (2013.01); *G02F 2001/133531* (2013.01); *G02F 2202/36* (2013.01)

(58) Field of Classification Search
  CPC ...... G02B 1/14; G02B 5/3025; G02B 5/3033; G02B 5/3041; G02B 5/305; G02B 5/3058; G02B 6/0238; G02B 6/004; G02B 6/0229; G02B 6/107; G02B 27/28; G02B 27/286; G02B 2207/101; G02F 1/133528; G02F 2001/133531; G02F 1/133536; G02F 1/133538; G02F 2001/133548; G02F 1/0136; G02F 2202/36
  USPC ......... 349/96, 99, 102, 103; 359/34, 485.01, 359/487.01, 487.05, 487.06, 492.01; 427/163.1, 163.2
  See application file for complete search history.

(56) References Cited

U.S. PATENT DOCUMENTS

| | | | |
|---|---|---|---|
| 2009/0167993 A1* | 7/2009 | Chen ................... | G02B 5/3083 349/96 |
| 2013/0016499 A1* | 1/2013 | Yee ....................... | H01L 33/507 362/97.1 |

(Continued)

FOREIGN PATENT DOCUMENTS

CN    103091892 A    5/2013

*Primary Examiner* — Jennifer D Carruth
*Assistant Examiner* — Ryan S Dunning
(74) *Attorney, Agent, or Firm* — CKC & Partners Co., Ltd.

(57) ABSTRACT

Disclosed herein is a polarizer for LCD. The polarizer includes a polarizing layer, a quantum rods layer comprising a plurality of quantum rods, a first protective layer and a second protective layer, wherein major axis of the quantum rods is aligned in a direction perpendicular to the absorption axis of the polarizing layer. Accordingly, the incident unpolarized light emitted from the backlight unit can be transferred to be polarized light by the quantum rods layer and pass through the polarizing layer directly for enhancing the utility of the backlight.

12 Claims, 3 Drawing Sheets

(56) References Cited

U.S. PATENT DOCUMENTS

| | | | |
|---|---|---|---|
| 2013/0135558 A1* | 5/2013 | Kim | G02F 1/133528 349/62 |
| 2014/0362556 A1 | 12/2014 | Cho et al. | |
| 2016/0085102 A1* | 3/2016 | Ohmuro | G02B 5/305 349/61 |
| 2016/0252658 A1* | 9/2016 | Kuo | G02B 1/14 359/487.01 |
| 2017/0108726 A1* | 4/2017 | Yanai | G02F 1/13362 |

* cited by examiner

POLARIZER HAVING QUANTUM ROD LAYER DIRECTLY CONTACTING A SURFACE OF A POLARIZING LAYER AT AN UNPOLARIZED LIGHT INCIDENT SIDE

RELATED APPLICATIONS

This application claims the priority benefit of Taiwanese application serial no. 104106271, filed on Feb. 26, 2015, which is incorporated herein by reference.

FIELD OF THE INVENTION

This invention relates to a polarizer used in a liquid crystal display. Particularly, the invention relates to an integral polarizer containing a quantum rod layer for enhancing color gamut and light utilization of the liquid crystal display.

BACKGROUND OF THE INVENTION

Polarizers commonly used in the liquid crystal display are absorptive polarizers. When, in a liquid crystal display, the non-polarized light emitted from the backlight is incident onto the absorptive polarizers, the incident light with a direction parallelly to the absorption axis direction of the polarizers is absorbed and not transmitted. Therefore, light emitted from backlight after passing through an absorptive polarizer will lose at least 50%. In addition, the light after passing through the polarizer will further pass through the electrode layer, color filter, liquid crystal module, glass substrate, and at least 90% of the light will be lost as compared with the light originally emitted from backlight. Accordingly, the light utilization of the backlight is quite low.

Several approaches are provided to enhance the light utilization of the backlight, such as, for example the use of brightness enhancement film and/or prism film in backlight unit for continuously refracting and reflecting to recirculate and recycle the light which is unable to be transmitted by the polarizer to be redirected out of the backlight unit in order to enhance the light efficiency of the backlight. However, for minimizing to affect the viewing angle, it requires a combination of several brightness-enhancement films and prism films to achieve the expected result, which will increase the thickness of the backlight unit.

Another approach is provided a quantum rod layer integrated into the backlight unit. The quantum rod is a nano-scale semiconductor material. It is in a shape of a one-dimensional rod-like structure. The major axis direction of the quantum rod is able to absorb the non-polarized light to emit a polarized light with a wavelength longer than the original non-polarized light. Because of the high internal quantum efficiency, a major of the incident light from the backlight is polarized. The quantum rods are aligned in the direction of major axis, and the emitted polarized light is efficiently passed through the transmission axis of the polarizer disposed on the liquid crystal display. Accordingly, compared to the traditional backlight unit, the light utilization of a backlight unit with the quantum rod layer will be enhanced. However, the semiconductor material of the quantum rods is susceptible to be adversely affected by oxygen and moisture in ambient environment to result in decreased durability thereof. It is proposed in the related art that the quantum rod layer is needed to be further packaged for isolating from the ambient environment. The thickness of the backlight unit will thus be increased. Furthermore, because the quantum rod layer is disposed in the backlight unit and is close to the light source, the heat generated from the light source will cause the heat fading of the quantum rods to decrease the fluorescent efficiency thereof, if no heat dissipation or insulation device is provided to the quantum rod layer. In addition, in a backlight unit with a quantum rod layer, the light from the backlight will pass through a plurality of optical films, such as the light guide film, diffuser film, bright enhancement film, multiple prism sheet and/or outer protective film of the polarizer, the emitted polarized light from the quantum rod layer will be reflected and refracted between the optical films. Thus, the polarization and directionality of the polarized light from the quantum rod layer is decreased. The light intensity which will pass through the polarizer under the liquid crystal cell is lowered than expected. In case of that a single quantum rod film is arranged with a backlight to be a polarized light source without any other optical films, such as a variety of optical functional films or polarizer, the polarization efficiency of the polarized light of backlight is still insufficient. This is because, although the transmission of the light from backlight through a quantum rod layer is more 50% than that through a single polarizer, the polarized light will be generated in both the major axis direction and the minor axis direction of the quantum rods, the quantum rod layer does not obtain a polarization the same as to the current polarizers with 99% of polarization to meet the commercial requirements of contrast ratio and color saturation for liquid crystal displays.

Therefore, the present invention discloses an integral polarizer which obtains a better light utilization and enhancing gamut of the current liquid crystal display without any modification of the current backlight module used therein.

SUMMARY OF THE INVENTION

In view of the above problems of the prior art, it is provided a novel, inventive and useful polarizer. The present polarizer includes a polarizing layer and a quantum rod layer. The quantum rod layer of the present polarizer enhances the luminous intensity transmitted into the polarizing layer thereof and, accordingly, the polarizing layer transmits out intensively polarized light. Furthermore, the protective layer for the present polarizer can be used as a barrier layer to the quantum rod layer. Therefore, when the present polarizer is used in the current liquid crystal display, the thickness of the backlight unit and/or the liquid crystal display will not increase. In addition, the present polarizer is not disposed in the backlight unit, and the present polarizer will not be affected by the heat generated from the light source. Therefore, the disadvantages arose in the state of art will be eliminated.

In an aspect of the present invention, it is provided an integral polarizer. In a preferred embodiment of the present invention, the polarizer includes a polarizing layer having an absorption axis; a quantum rod layer disposed on a surface of the polarizing layer, the quantum rod layer including a plurality of quantum rods, wherein major axis of the quantum rods is aligned in a direction perpendicular to the absorption axis of the polarizing layer and parallel to the transmission axis of the polarizing layer; a first protective layer disposed on one side of the polarizing layer; and a second protective layer disposed on the quantum rod layer.

In a preferred embodiment of the polarizer of the present invention, the quantum rod layer is a light incidence side of an incident light, and the polarizing layer is a light exiting side.

In another preferred embodiment of the polarizer of the present invention, a wavelength of the incident light is in a range from 300 nm to 495 nm to excite the quantum rod layer.

In further a preferred embodiment of the present invention, a semiconductor material of the quantum rods is a compound selected from the group consisting of Group III-V, Group II-VI, Group IV-VI and combinations thereof.

In still a preferred embodiment of the present invention, the polarizing layer of the present polarizer can be an absorptive polarizing layer, a reflective polarizing layer, dye-type polarizing layer, coating-type polarizing layer, wire-grid polarizing layer or combinations thereof.

In further another preferred embodiment of the present invention, the quantum rods are dispersed in a polymer to form the quantum rod layer. The polymer used for dispersing quantum rods and forming a layer includes polyvinyl alcohol, polymethyl methacrylate, cyclo-olefin polymer or polysiloxanes.

In further still a preferred embodiment of the present invention, the material for the first protective layer and the second protective layer includes cellulose triacetate, polyethylene terephthalate, polymethyl methacrylate, cyclo-olefin polymer, polysiloxanes or metal oxide-containing organic/inorganic composite film.

In a preferred embodiment of the present invention, the first protective layer is an optical compensation film.

In an embodiment of the present invention, further including an encapsulating layer disposed between the first protective layer and the polarizing layer or between the second protective layer and the quantum rod layer. The encapsulating layer includes polymethyl methacrylate, epoxy resin, polysiloxanes, fluororesin polymer or copolymer.

DESCRIPTION OF THE DRAWINGS

The invention can be more fully understood by reading the following detailed description of the embodiment, with reference made to the accompanying drawings that illustrate the invention and it should be noted that the drawings are not to scale and only for illustration only.

DETAILED DESCRIPTION OF THE INVENTION

The polarizers disclosed in the present invention are set forth in the appended claims. Objectives, advantages, and a preferred mode of making and using the polarizers may be understood best by reference to the following detailed description in conjunction with the accompanying drawings. The description provides information that enables a person skilled in the art to make and use the claimed subject matter, but may omit certain details already well-known in the art. The following detailed description is, therefore, not to be taken in a limiting sense, and the scope of the illustrative embodiments are defined only by the appended claims.

The polarizers of the present invention will now be described in reference to the accompanying drawings. Similar numbers on the drawings refers to the same elements.

Figure 1A:
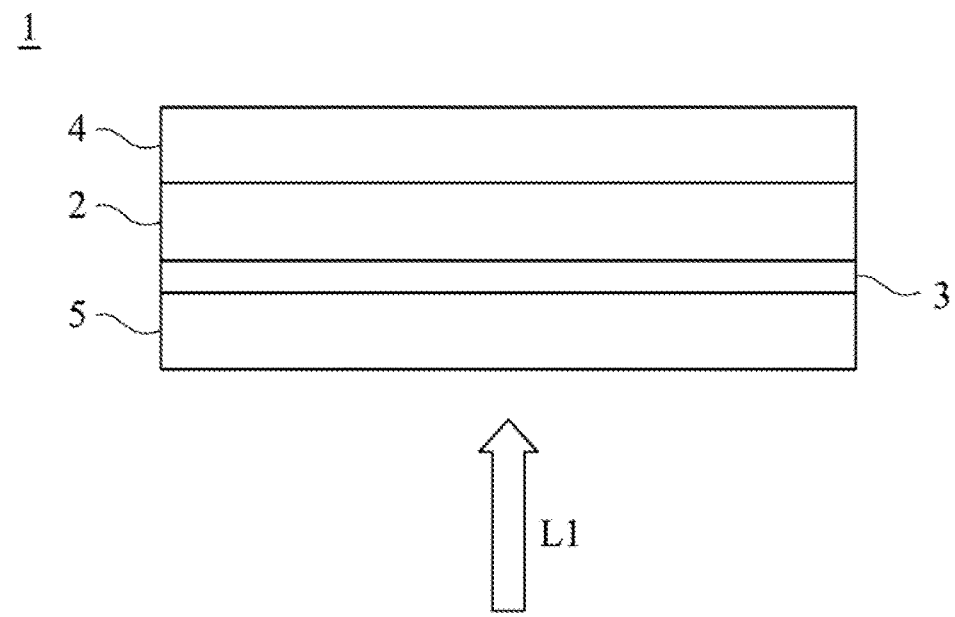
FIGS. 1a and 1b show perspective views of an exemplary embodiment of the present invention.
Figure 1B:
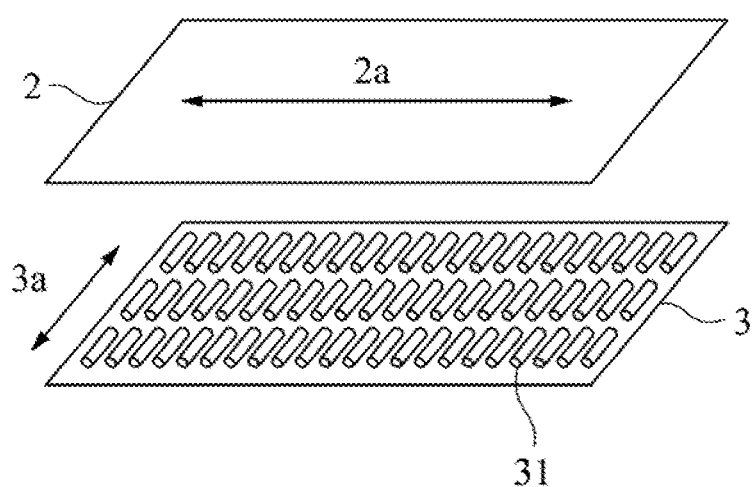

FIGS. 1a and 1b show the perspective views of the polarizer 1 of a preferred exemplary embodiment of the present invention. The polarizer 1 includes a polarizing layer 2 with absorption axis 2a; a quantum rod layer 3 disposed on the polarizing layer 2 and including a plurality of quantum rods 31, wherein the major axis 3a of the quantum rods is aligned in a direction perpendicular to the absorption axis 2a of the polarizing layer; the first protective layer 4 disposed on the polarizing layer 2; and the second protective layer 5 disposed on the quantum rod layer 3.

In an embodiment of a polarizer of the present invention, the light L1 is incident to the quantum rod layer 3 and passes through the polarizing layer 2. The unpolarized light L1 incident to the quantum rod layer 3 is transferred to a polarized light with a polarizing axis perpendicular to the direction of the absorption axis 2a of the polarizing layer 2. The polarized light passes through the direction of the transmission axis of the polarizing layer 2.

In a polarizer of another exemplary embodiment of the present invention, the wavelength of the incident light is in a range between ultraviolet ray and blue light, preferably between 300 nm to 495 nm. The light incident to the quantum rod layer excites the quantum rods to emit a light with a longer wavelength. Further, the color of the light emitted from the quantum rod layer can be adjusted by changing the size of the quantum rods in the said layer. For example, CdSe quantum rods with a major axis of 30 nm to 40 nm and a minor axis of the 5 nm to 10 nm will emit a red light of wavelength 630 nm under a blue light source of wavelength 460 nm. When the CdSe quantum rods with a major axis of 20 nm to 30 nm and a minor axis of the 2 nm to 5 nm will emit a green light of wavelength 550 nm under a blue light source. Thus, by adjusting ratio of the content of quantum rods with different sizes in the quantum rod layer, the light from the quantum rod layer, which is mixed with the green light and the red light respectively emitted from the quantum rods with different sizes, together with the transmitted blue light from the light source will be adjusted to be the desired white light source for displays. In addition, because the excitation spectrum of the quantum rods material is with a narrow full-width-at-half-maximum (FWHM), the gamut area of the display using the present polarizer will be larger.

In an embodiment of the present invention, the semiconductor material of the quantum rods is a material selected from the group consisted of Group III-V, Group II-VI, Group IV-VI and the combination thereof. The semiconductor material can include but not limit to AlN, AlP, AlAs, AlSb, GaN, GaP, GaAs, GaSb, InN, InP, InSb, ZnO, ZnS, ZnSe, ZnTe, CdS, CdSe, CdTe, HgSe, HgTe, PbS, PbSe or PbTe.

In an embodiment of the present invention, the polarizing layer of the present polarizer can be selected in accordance with the use of the display, for example, an absorptive polarizing layer, a reflective polarizing layer, dye-type polarizing layer, coating-type polarizing layer, wire-grid polarizing layer or the combination thereof.

In an embodiment of the present invention, the quantum rods are dispersed in polymer and aligned by electric field driving, stretching, rubbing and the like in the direction of the major axis thereof, and further, cured to form a layer of quantum layer. The polymer used for dispersing quantum rods and forming a layer includes polyvinyl alcohol, polymethyl methacrylate, cyclo-olefin polymer or polysiloxanes.

Figure 2A:
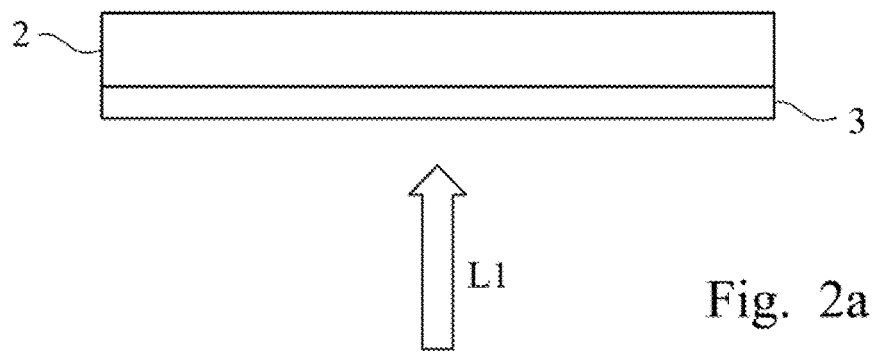
FIGS. 2a to 2c show perspective views of various stack structures of a quantum rod layer, polarizing layer and diffuser film of exemplary embodiments of the present invention.
Figure 2B:
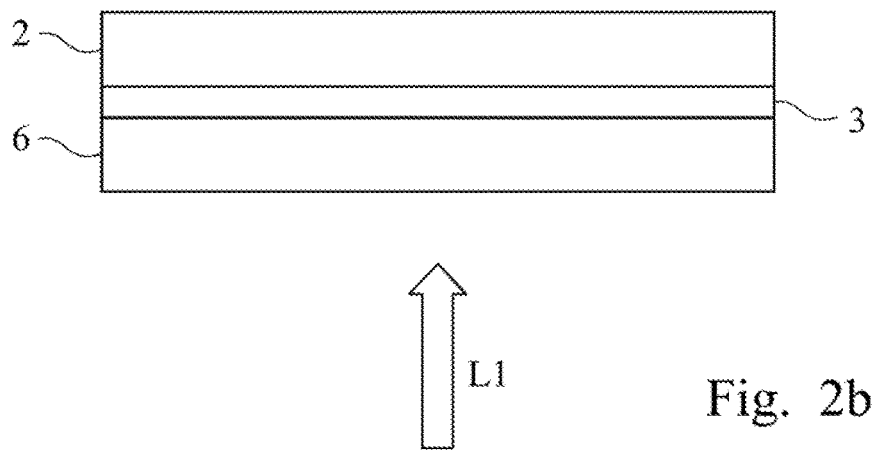
Figure 2C:
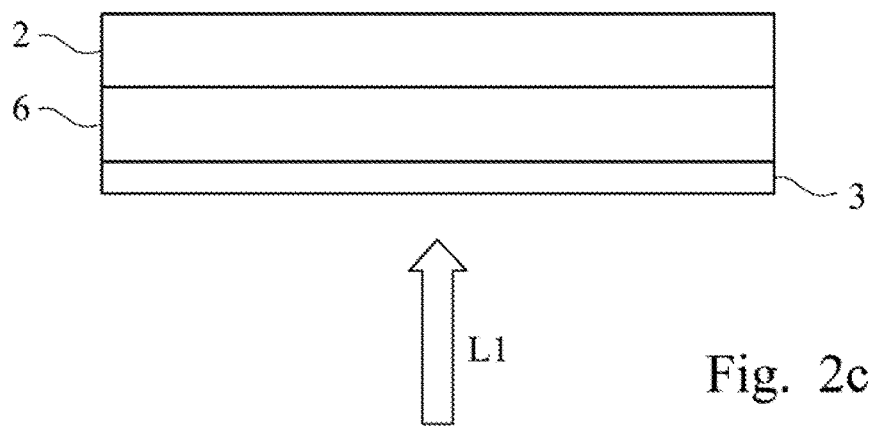
Figure 3:
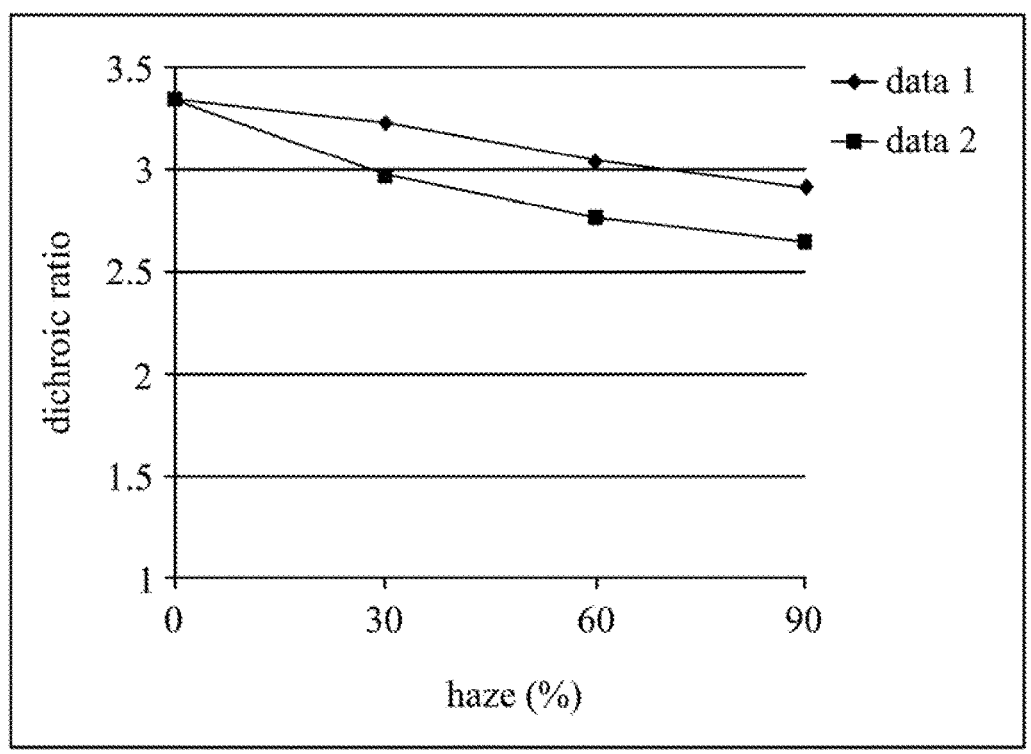
FIG. 3 is a graph showing the effect of the different haze of the diffuser films to the dichroic ratio of the quantum rod layers.

Further referring to Table 1, the quantum rods are dispersed in polyvinyl alcohol in an amount of 5.48 percent by weight on the basis of the weight of the polyvinyl alcohol and stretched 5 times for forming a quantum rod layer. The quantum rod layer is stacked on a polarizing layer with or without a diffuser film used in the backlight unit. The stacked films with quantum rod layer is detected under a blue light source with a wavelength 445 nm by a Mechanics ConoScope spectrophotometer manufactured by autronic-MELCHERS GmbH to obtain a dichroic ratio (DR). The dichroic ratio is obtained by an equation $DR=Y_{//}/Y_{\perp}$, which the $Y_{//}$ is the transmittance obtained as the major axis of the quantum rod layer is parallel to the transmission axis of the polarizing layer, $Y_{\perp}$ is the transmittance obtained as the major axis of the quantum rod layer is perpendicular to the transmission axis of the polarizing layer. When a light is not transmitted through a quantum rod layer, the $Y_{//}$ and $Y_{\perp}$ are almost the same, the dichroic ratio is 1.06. When a light is transmitted to a single polarizing layer, the luminance is 98 nits. As the dichroic ratio is higher, the dichroism of the sample is significant. When a light is transmitted through a stack layer with a higher dichroism, the light will be transformed into a light with a better polarization and directionality. The arrangement of the stacked layers of the film of Example 1 is shown in FIG. 2a. The dichroic ratio is determined by the light transmitting through the quantum rod layer 3 and further through the polarizing layer 2. The dichroic ratio of the quantum rod layer 3 is 3.35 and the luminance is increased to 595 nits as the blue light is excited to generate green light and red light. The ratio of the green light and red light is increased after the light from the light source passing through the quantum rod layer 3 and is polarized to a light with a transmission axis parallel to the transmission axis of the polarizing layer 2. The arrangement of the layers of the film of Example 2 is shown FIG. 2b. The data for Example 2 is determined after a light passing through a diffuser film 6 having an optical haze of 30%, passing through the quantum rod layer 3 and polarizing layer 2 in sequence. The diffuser film is the one which is commonly used in the backlight unit for liquid crystal display. The dichroic ratio of the diffuser film 6 and quantum rod layer 3 is 3.23 and the luminance is 581 nits. The arrangement of the layers of the film of Example 3 is shown FIG. 2C. The data for Example 3 is determined by after the light from the light source passes through the quantum rod layer 3, a diffuser film 6 with haze of 30% diffuser film 6 and the polarizing layer. The dichroic ratio of the quantum rod layer 3 and the diffuser film is 2.98 and the luminance is 538 nits. From that data of Examples 2 and 3, it appears when the diffuser film 6 is disposed between the quantum rod layer 3 and the polarizing layer 2 as shown in Example 3, the dichroic ratio is decreased. It shows that the light passing through quantum rod layer 3 is transformed to be a light with high directionality and then passes through the diffuser film of the backlight unit. Because the diffuser film 6 is a non-directional optical film, when the light with high directionality passing through it, the light will be reflected, scattered and refracted so as to lower the difference between $Y_{//}$ and $Y_{\perp}$. In the arrangement of Example 3, the polarized light generated by the quantum rod layer 3 with a transmission axis in a direction parallel to that of the polarizing layer 2 is interfered. The dichroic ratio and the luminance of Example 2 are both slightly lower. It is because that the collimation of the light source after passing diffuser film 6, which is arbitrarily to be reflected, refracted and scattered by the particles in the diffuser film, is interfered to shift the incident angle of the light into the quantum rod layer. This diffusion of the light source is lowered the efficiency of the light excitement of the quantum rods in the quantum rod layer so as to the utilization of light be lowered. However, the utilization of light of Example 2 is superior to that of Example 3. Referring to FIG. 3, it shows the effect of the different haze of the diffuser films to the dichroic ratio of the quantum rod layers. The tests are conducted in the arrangement of Examples 2 and 3, which the Data 1 is the diffuser film arranged as that in Example 2, and Data 2 is the diffuse film arranged as that in Example 3. From the test results shown in FIG. 3, as the haze of the diffuser film is increased, the dichroic ratio of the stacked films of Example 3 is decreased more than that of the stacked layers of Example 2. In addition, the higher the haze of the diffuser films is, the lower the dichroic ratio of the stacked films is. It may be when the incident light passes through the diffuser film, the light is reflected, refracted and scattered and the dichroic ratio will accordingly decrease. Being different to the use of the quantum rod layer in the backlight unit as prior art suggested, the present invention disclosed the quantum rod layer to be integrated with a polarizing film, which the light from the backlight source passes through the quantum rod layer to excite to a polarized light which will directly pass the polarizing layer. Accordingly, since no other optical layer is disposed between the quantum rod layer and the polarizing film, the polarized light will not be interfered thereby, and thus the dichroic ratio will not be reduced.

TABLE 1

| Example | I | II | III | Blue light source |
|---|---|---|---|---|
| Dichroic ratio | 3.35 | 3.23 | 2.98 | 1.06 |
| Luminance (nits) | 595 | 581 | 538 | 98 |

In an embodiment of the present invention, the material for the first protective layer and the second protective layer includes cellulose triacetate, polyethylene ethylene terephthalate, polymethyl methacrylate, cyclo-olefin polymer, polysiloxanes or metal oxide-containing organic/inorganic composite film.

In an embodiment of the present invention, the first protective layer is an optical compensation film, such as, for example for improving the viewing angle or the color-shift.

In an embodiment of the present invention, an encapsulating layer is optionally provided between the first protective layer and polarizing layer, and the second protective layer and the quantum rod layer, respectively, to protect the quantum rod layer from moisture, oxygen in the environment for extending the life of the quantum rod layer. The encapsulating layer includes polymethyl methacrylate, epoxy resin, polysiloxanes, fluororesin polymer or copolymer.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A polarizer having an unpolarized light incident side, the polarizer comprising:
   a polarizing layer having an absorption axis;

a quantum rod layer directly contacting a surface of the polarizing layer, the quantum rod layer comprising a plurality of quantum rods, wherein major axis of the quantum rods is aligned in a direction perpendicular to the absorption axis of the polarizing layer;

a first protective layer disposed on the polarizing layer; and a second protective layer disposed under the quantum rod layer, the second protective layer is at the unpolarized light incident side through which an unpolarized light is transmitted into the polarizer in the order of the second protective layer, the quantum rod layer, and the polarizing layer;

wherein the polarizer is disposed under a liquid crystal cell.

2. The polarizer of claim 1, wherein the quantum rod layer is a light incidence side of an incident light, and the polarizing layer is a light exiting side.

3. The polarizer of claim 2, wherein a wavelength of the incident light is in a range from 300 nm to 495 nm to excite the quantum rod layer.

4. The polarizer of claim 1, wherein a semiconductor material of the quantum rods is a compound selected from the group consisting of Group III-V, Group II-VI, Group IV-VI and combinations thereof.

5. The polarizer of claim 1, wherein the polarizing layer is an absorptive polarizing layer, a reflective polarizing layer, dye-type polarizing layer, coating-type polarizing layer, wire-grid polarizing layer or combinations thereof.

6. The polarizer of claim 1, wherein the quantum rods are dispersed in a polymer to form the quantum rod layer.

7. The polarizer of claim 6, wherein the polymer used to form the quantum rod layer comprises polyvinyl alcohol, polymethyl methacrylate, cyclo-olefin polymer or polysiloxanes.

8. The polarizer of claim 1, wherein the first protective layer and the second protective layer comprises cellulose triacetate, polyethylene terephthalate, polymethyl methacrylate, cyclo-olefin polymer, polysiloxanes or metal oxide-containing organic/inorganic composite film.

9. The polarizer of claim 1, wherein the first protective layer is an optical compensation film.

10. The polarizer of claim 1, further comprising an encapsulating layer disposed between the first protective layer and the polarizing layer or between the second protective layer and the quantum rod layer.

11. The polarizer of claim 10, wherein the encapsulating layer comprises polymethyl methacrylate, epoxy resin, polysiloxanes, fluororesin polymer or copolymer.

12. A liquid crystal display (LCD) device, comprising:

a liquid crystal cell;

a backlight unit under the liquid crystal cell; and a polarizer disposed between the liquid crystal cell and the backlight unit, the polarizer having an unpolarized light incident side, wherein the polarizer comprising:

a polarizing layer having an absorption axis;

a quantum rod layer directly contacting a surface of the polarizing layer, the quantum rod layer comprising a plurality of quantum rods, wherein major axis of the quantum rods is aligned in a direction perpendicular to the absorption axis of the polarizing layer;

a first protective layer disposed on the polarizing layer; and a second protective layer arranged in a way that the quantum rod layer is positioned between the polarizing layer and the second protective layer, the second protective layer is at the unpolarized light incident side through which an unpolarized light is transmitted into the polarizer in the order of the second protective layer, the quantum rod layer, and the polarizing layer.

* * * * *